United States Patent [19]

Takechi

[11] Patent Number: 4,807,084
[45] Date of Patent: Feb. 21, 1989

[54] SUPERCONDUCTING MAGNET APPARATUS WITH EMERGENCY RUN DOWN UNIT

[75] Inventor: Moriaki Takechi, Ako, Japan

[73] Assignee: Mitsubishi Denki Kabushiki Kaisha, Japan

[21] Appl. No.: 92,589

[22] Filed: Sep. 3, 1987

[30] Foreign Application Priority Data

Sep. 9, 1986 [JP] Japan .................. 61-210844

[51] Int. Cl.$^4$ .............................................. H02H 9/00
[52] U.S. Cl. ...................................... 361/141; 361/19; 335/216
[58] Field of Search ................. 361/19, 141; 335/216; 307/245, 306; 324/320, 322; 200/289; 323/360

[56] References Cited

U.S. PATENT DOCUMENTS 4,559,576  12/1985  Ries ........................... 361/19
4,763,211  8/1988   Takechi ..................... 361/141

FOREIGN PATENT DOCUMENTS 4947319  12/1974  Japan ........................... 361/19
1513154  6/1978   United Kingdom ........ 361/19

Primary Examiner—L. T. Hix
Assistant Examiner—David M. Gray
Attorney, Agent, or Firm—Leydig, Voit & Mayer

[57] ABSTRACT

A superconducting magnet apparatus comprises a superconducting coil, a persistent current switch with a small current bearing capacity, and a protective element respectively connected in parallel with the superconducting coil and an emergency run down unit including a heater circuit having a heater power source, a heater element disposed in proximity to the superconducting coil, and a heater circuit switch connected in series with the heater element. Thus, the heater element is energized and warmed to bring at least a part of the superconducting coil into a normal state.

5 Claims, 4 Drawing Sheets

SUPERCONDUCTING MAGNET APPARATUS WITH EMERGENCY RUN DOWN UNIT

BACKGROUND OF THE INVENTION

This invention relates to a superconducting magnet apparatus with an emergency run down unit. More particularly, it relates to a superconducting magnet apparatus with an emergency run down unit which is adapted to operate in a persistent current mode for the purpose of generating a static field in a magnetic resonance imaging system.

FIG. 1 is a schematic arrangement diagram exemplifying a prior-art superconducting magnet apparatus with an emergency run down unit of the type specified above. Referring to FIG. 1, numeral 1 designates a superconducting coil, in parallel with which a persistent current switch 2 is connected. The persistent current switch 2 is composed of a persistent current switch-superconductor 3, and a persistent current switch-heater 4 which is disposed in proximity thereto. Numeral 5 indicates a protective element, which is an appropriate resistor or diode and which is connected in parallel with the superconducting coil 1. This protective element 5 is provided in order to suppress a voltage which develops across the persistent current switch 2 when quenching has occurred in the superconducting coil 1. Such an arrangement is housed in a cold vessel 10. The interior of the cold vessel 10 is maintained at a required low temperature by a suitable refrigerant (not shown). In addition, numeral 11 indicates a heater power source which is connected to the persistent current switch-heater 4 through a heater circuit switch 12. A magnetizing current (or persistent current) $I_C$ flows circulating through a closed circuit which consists of the superconducting coil 1 and the persistent current switch-superconductor 3. Assuming now that the heater circuit switch 12 be in its open state, the persistent current switch 2 is cooled by the refrigerant to fall into a superconducting state.

Before the description of the operation of such a prior-art superconducting magnet apparatus with an emergency run down unit, the magnetization and demagnetization of the superconducting magnet apparatus in the case where the apparatus of this type is run in a persistent current mode will now be explained.

Shown in FIG. 2 is such a prior-art superconducting magnet apparatus with an emergency run down unit wherein a magnetizing portion is additionally provided. Referring to FIG. 2, numeral 16 indicates a magnetizing power source, which is connected in parallel with the superconducting coil 1 through current leads 17. In FIG. 2, parts assigned the same numerals as in FIG. 1 are identical or equivalent parts and shall be omitted from the description.

Now, the case where such a superconducting magnet apparatus is to be magnetized will be considered. First, the heater circuit switch 12 is closed to energize the persistent current switch-heater 4 and to heat the persistent current switch-superconductor 3. Then, this persistent current switch-superconductor 3 causes transition from the superconducting state to the normal state thereof and gives rise to a predetermined resistance.

FIG. 3 is a diagram exemplifying an equivalent circuit of the superconducting magnet apparatus which lies in the above state. In FIG. 3, symbol $r_P$ denotes the resistance of the persistent current switch-superconductor 3 in the normal state, symbol $r_D$ the impedance of the protective element 5, and symbol L the self-inductance of the superconducting coil 1. Also, symbol $I_S$ denotes an output current from the magnetizing power source 16, symbol $I_C$ a magnetizing current for the superconducting coil 1, and symbol $I_P$ a branch current for the persistent current switch 2.

The terminal voltage of the superconducting coil 1, namely, the voltage $V_P$ across the persistent current switch 2 is given by the following formula when, under such a state, the output current $I_S$ from the magnetizing power source 16 is increased with a fixed rise rate $\alpha$:

$$V_P = \alpha L(1 - e^{-(r/L)t})$$

where r denotes the parallel resultant resistance of the resistances $r_P$ and $r_D$. On this occasion, the current $I_P$ which is branched to the persistent current switch 2 is given by:

$$I_P = V_P / r_P$$

In general, however, the conduction bearing capacity of the persistent current switch 2 in the normal state is smaller than in the superconducting state. Therefore, the current rise rate $\alpha$ needs to be properly controlled lest the voltage $V_P$ across the persistent current switch 2 during the magnetization should become excessive.

Assuming now that the magnetizing current $I_C$ for the superconducting coil 1 has reached a predetermined operating current, the heater circuit switch 12 is opened to cut off current flowing through the persistent current switch-heater 4. Then, the persistent current switch-superconductor 3 is cooled by the refrigerant and undergoes transition into the superconducting state. Under such a state, a superconducting closed circuit consisting of the superconducting coil 1 and the persistent current switch 2 is constructed, and the magnetizing current $I_C$ flows circulating this superconducting closed circuit.

Here, the output current $I_S$ from the magnetizing power source 16 is decreased, and the current leads 17 are detached thereby to separate the magnetizing power source 16 from the superconducting coil 1. Then, the same arrangement as shown in FIG. 1 is established, and the persistent current mode is carried out with the magnetizing current $I_C$ circulating through the superconducting coil 1 as the persistent current. In this state, the superconducting coil 1 is separate from the magnetizing power source 16 and is not affected by supply voltage, temperature changes, etc., so that the superconducting magnet apparatus can generate a very stable magnetic field. The apparatus therefore performs the operation based on the persistent current mode to the end of, for example, generating a static field in a magnetic resonance imaging system of which a very high stability is required.

Next, demagnetization of the superconducting magnet apparatus being operated in the persistent current mode is usually executed by tracing a process reverse to that of the foregoing magnetization.

That is, the superconducting magnet apparatus being operated with the arrangement shown in FIG. 1 has the magnetizing power source 16 connected to the superconducting coil 1 through the current leads 17, so as to establish the arrangement shown in FIG. 2. Subsequently, the output current $I_S$ from the magnetizing power source 16 is increased so as to equalize to the magnetizing current $I_C$ flowing through the superconducting coil 1. Thereafter, the heater circuit switch 12 is closed. Then, the persistent current switch-heater 4 is energized, and the persistent current switch-superconductor 3 is heated to cause transition into the normal state, so that the state as shown in FIG. 3 is established. In this state shown in FIG. 3, the predetermined resistance develops in the persistent current switch-superconductor 3, and hence, the output current $I_S$ from the magnetizing power source 16 is substantially equal to the magnetizing current $I_C$ for the superconducting coil 1. Thus, the superconducting coil 1 can be demagnetized in such a way that the output current $I_S$ from the magnetizing power source 16 is gradually lowered down to zero.

The demagnetization for the superconducting magnet apparatus being operated in the persistent current mode is usually executed by the method described above. Therefore, even when urgent demagnetization is required because of, for example, the adsorption of an iron piece or the outbreak of a fire, various steps are needed such as preparing the magnetizing power source 16, connecting the current leads 17, increasing the output current $I_S$ from the magnetizing power source 16 and opening the persistent current switch 2. Accordingly, the demagnetization in the case of employing such a magnetizing power source takes a long time.

For this reason, a method of urgent demagnetization to be described below has heretofore been applied to a superconducting magnet apparatus which is operated in the persistent mode.

By adopting the arrangement as shown in FIG. 1, the superconducting magnet apparatus is operated in the persistent current mode, while the persistent current switch-heater 4 is held connected to the heater power source 11 through the heater circuit switch 12 which is normally open. When urgent demagnetization becomes necessary, the heater circuit switch 12 is closed. Thus, the persistent current switch-heater 4 is energized, and the persistent current switch-superconductor 3 is heated to cause transition into the normal state, thereby to exhibit the resistance of a predetermined value.

FIG. 4 is an equivalent circuit diagram of the superconducting magnet apparatus which is in the operating state as described above. Since the persistent current switch-superconductor 3 develops the resistance owing to the transition from the superconducting state into the normal state, the magnetizing current $I_C$ having circulated through the superconducting coil 1 decays due to the consumption of energy on account of the normal resistance $r_P$ of the persistent current switch 2 and the parallel impedance $r_D$ of the protective element 5, and the superconducting coil 1 can be demagnetized. When a current decay speed on this occasion is studied, it is dominated by the following time constant which is stipulated by the self-inductance L of the superconducting coil 1, as well as the parallel resultant resistance r between the normal resistance $r_P$ of the persistent current switch 2 and the parallel impedance $r_D$ of the protective element 5:

$$\tau = L/r$$

In consequence, the value of the parallel resultant resistance r needs to be selected large in order to demagnetize the superconducting magnet apparatus in a short time. Since, however, the voltage across the persistent current switch 2 is given by:

$$V_P = r \, I_C$$

the value of the parallel resultant resistance r selected large renders the terminal voltage of the persistent current switch 2 high, and the current $I_P$ to flow through this persistent current switch 2 increases.

Since the prior-art superconducting magnet apparatus with the emergency run down unit is constructed as described above, the parallel resultant resistance r must be selected large in order to realize demagnetization in a short time. This increases the voltage across the persistent current switch, which has led to the problem that a persistent current switch of very large current bearing capacity must be used. Besides, in a case where an ordinary persistent current switch of small current bearing capacity is used, an element of low resistance needs to be selected as the protective element, which has led to the problem that the period of time for the demagnetization becomes long.

SUMMARY OF THE INVENTION

This invention has the effective of eliminating the problems as described above, and has for its main object to provide a superconducting magnet apparatus with an emergency run down unit in which, even when a protective element corresponding to a persistent current switch is of low resistance, a superconducting magnet being operated in a persistent current mode can be demagnetized in a short time.

The superconducting magnet apparatus according to this invention comprises a superconducting coil, a persistent current switch and a protective element respectively connected in parallel with the superconducting coil; and an emergency run down unit including a heater circuit having a heater power source and a heater element disposed in proximity to the superconducting coil, and a heater element switch connected in series with the heater circuit.

DESCRIPTION OF THE PREFERRED EMBODIMENTS

Figure 1:
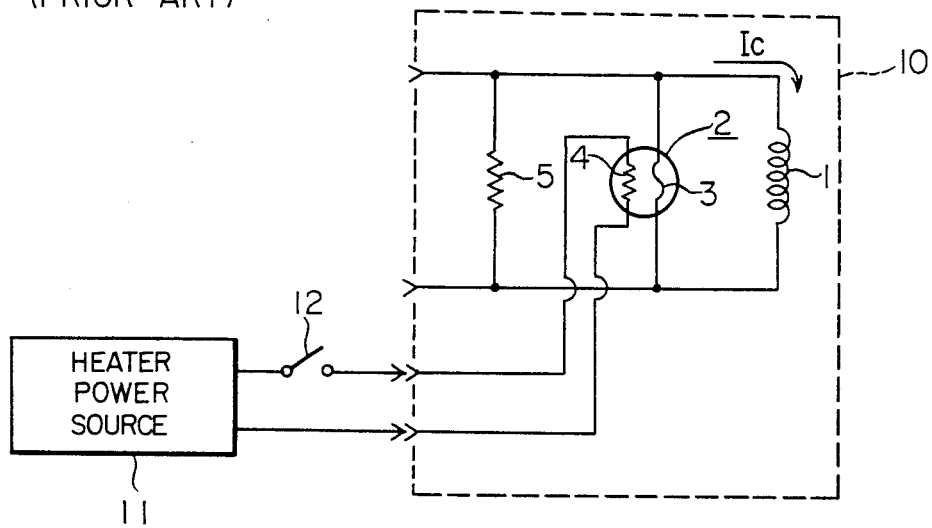
FIG. 1 is a schematic arrangement diagram of a prior-art superconducting magnet apparatus with an emergency run down unit.
Figure 2:
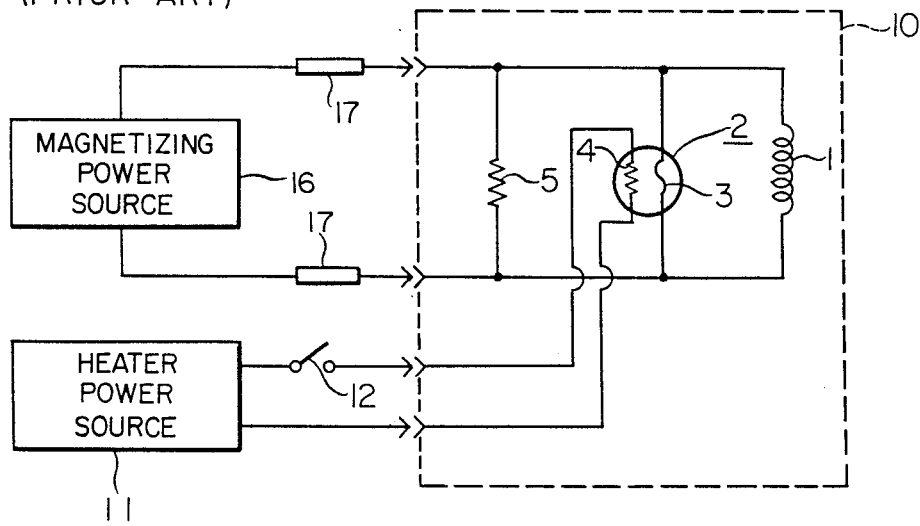
FIG. 2 is a schematic arrangement diagram of the apparatus of the prior-art example which is additionally provided with a magnetizing power source.
Figure 3:
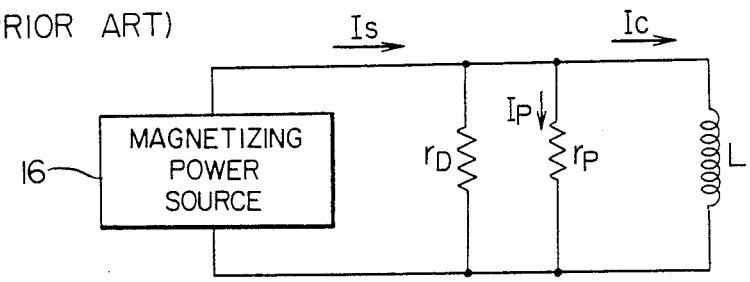
FIG. 3 is an equivalent circuit diagram of the prior-art example of FIG. 2 during the operation thereof.
Figure 4:
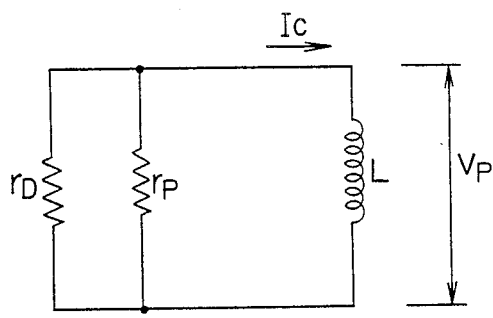
FIG. 4 is an equivalent circuit diagram of the prior-art example during the urgent demagnetizing operation thereof.
Figure 5:
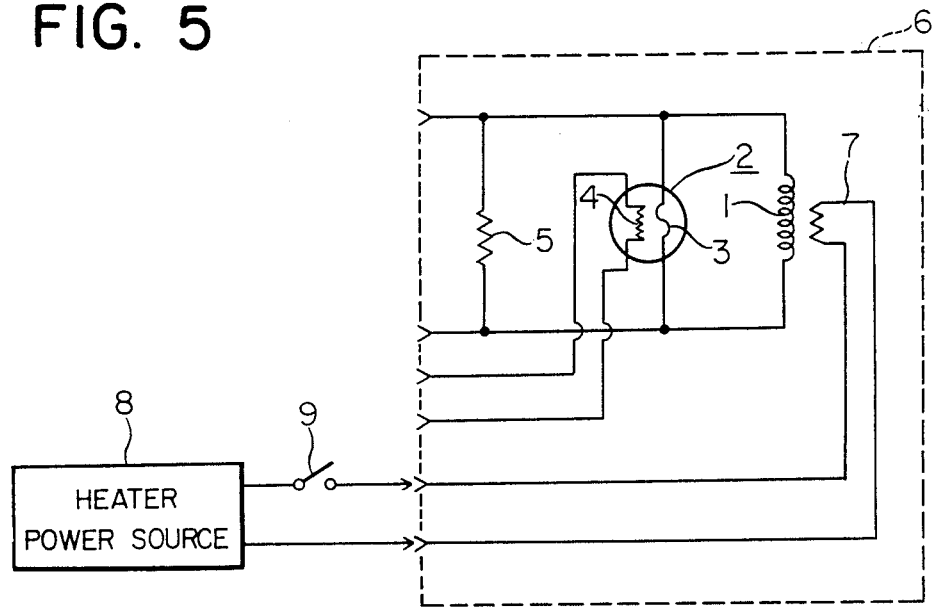
FIG. 5 is a schematic arrangement diagram of a superconducting magnet apparatus with an emergency run down unit according to an embodiment of this invention.

FIG. 5 is a schematic arrangement diagram showing a superconducting magnet apparatus with an emergency run down unit in a preferred embodiment of this invention. Referring to FIG. 5, numeral 1 designates a superconducting coil, in parallel with which a persistent current switch 2 is connected. This persistent current switch 2 includes a persistent current switch-superconductor 3, and a persistent current switch-heater 4 which is disposed in the vicinity of the superconductor 3. Also, an appropriate protective element 5 is in parallel to the superconducting coil 1. Further, a superconducting coil heater 7 as a heater element is disposed in proximity to the superconducting coil 1. Such an arrangement is housed in a cold vessel 6. In addition, the superconducting coil heater 7 is connected to a heater power source 8 through a heater circuit switch 9.

Next, the operation of the embodiment will be described. It is now assumed that urgent demagnetization has become necessary during the operation of the apparatus in the persistent current mode. On this occasion, the heater circuit switch 9 is closed, whereby the superconducting coil heater 7 generates heat and warms the superconducting coil 1 owing to the energization thereof by the heater power source 8. When a predetermined critical temperature has been exceeded by the temperature rise, at least a part of the superconducting coil 1 reverts back into a normal conducting state and develops a resistance. Herein, even if a very slight portion of the superconducting coil 1 reverts back into a normal conducting state, a Joule loss arises on account of the resistance in this portion, and the reverted normal conductivity portion expands. Thus, a magnetizing current $I_C$ which circulates through a closed circuit having the superconducting coil 1 and the persistent current switch-superconductor 3 decays rapidly until the superconducting coil 1 is demagnetized. The speed of the demagnetization on this occasion is decided by the resistance and self-inductance of the superconducting coil 1 at the reversion into the normal conducting state, and the superconducting coil 1 can be demagnetized within, at most, several seconds even when an element of low resistance is used as the protective element 5. Besides, when the protective element of low resistance 5 is used, the terminal voltage of the persistent current switch 2 during the demagnetization is rendered low, and excess current bearing capacity of the persistent current switch 2 can be avoided.

Figure 6:
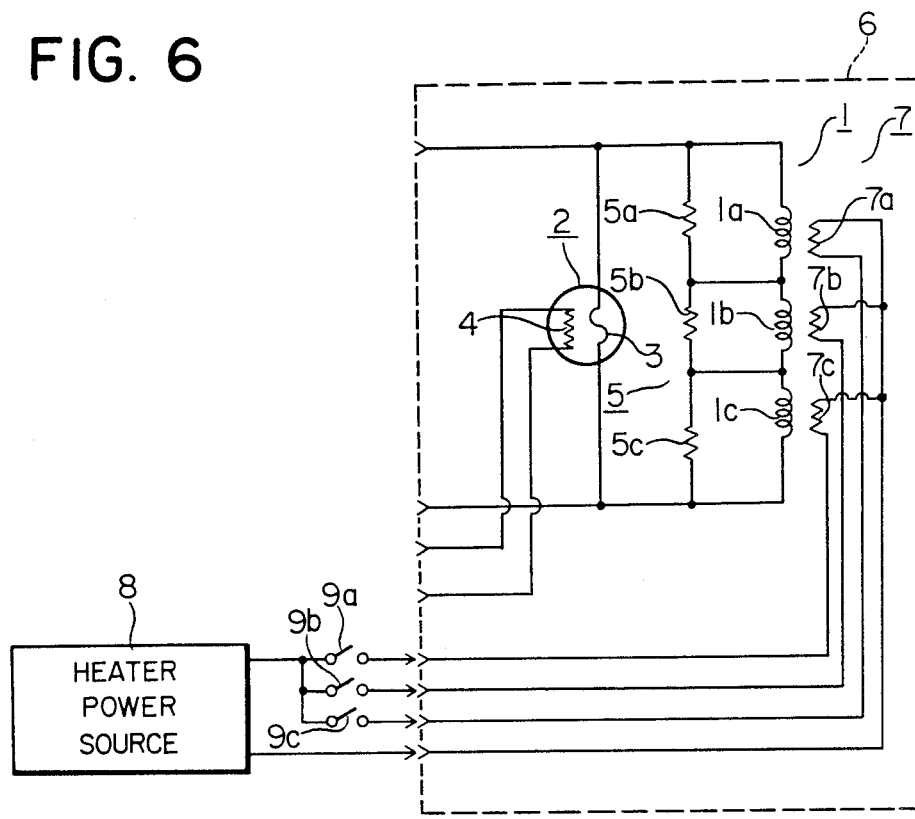
FIG. 6 is a schematic arrangement diagram of the embodiment which is partly modified.

FIG. 6 is a schematic arrangement diagram of an embodiment in which the above embodiment is partly modified. Referring to FIG. 6, symbols 1a-1c denote coil segments which constitute the superconducting coil 1, symbols 5a-5c protective elements which are connected in parallel with the respective coil segments 1a-1c, symbols 7a-7c heater elements (superconducting coil heaters) which are disposed in proximity to the respective coil segments 1a-1c, and symbols 9a-9c heater circuit switches which correspond to the respective heater elements 7a-7c. In FIG. 6, components assigned the same numerals as in FIG. 5 are identical or equivalent, and they shall be omitted from the description.

When the superconducting coil 1 composed of the plurality of coil segments 1a-1c is used as illustrated in FIG. 6, it is sometimes the case that all the coil segments cannot be demagnetized merely by disposing a heater element which corresponds to only a specified one of the coil segments.

For this reason, heater elements are individually disposed in proximity to all the respective coils segments, and the heater circuit switches 9a-9c corresponding to the heater elements are closed, whereby all the coil segments can be demagnetized.

Although, in the embodiment, the case of connecting the plurality of heater elements 7a-7c in parallel with the heater power source 8 is illustrated, the invention is not restricted thereto as they can be connected in series.

Figure 7:
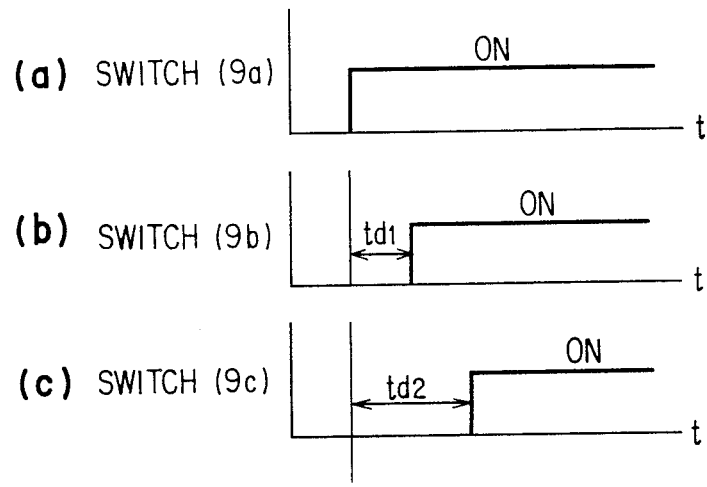
FIG. 7 is an explanatory diagram showing the order of closing heater circuit switches in the modified embodiment of FIG. 6.

FIG. 7 is an explanatory operating chart showing the order in which the plurality of heater circuit switches 9a-9c are closed in the embodiment of FIG. 6. In general, when the superconducting coil 1 is subjected to the transition into the normal state by energizing and warming the heater elements 7a-7c, a refrigerant in the cold vessel 6 gasifies due to the resulting resistance loss, and it is emitted through an exhausting port (not shown) provided in a suitable place of the cold vessel 6. Now, if time differences as indicated in FIG. 7 are set for the closing times of the heater circuit switches 9a-9c, the transitions of the coil segments $1a \propto 1c$ into the normal state occur at predetermined time differences, and the exhausting speed of the gasified refrigerant can be limited accordingly.

Figure 8:
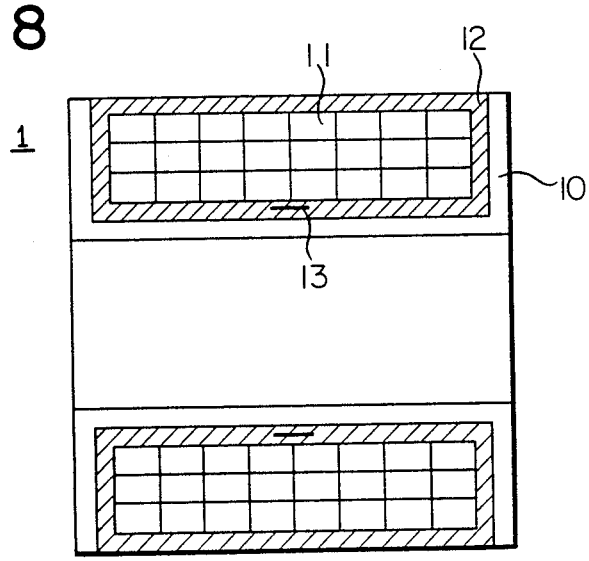
FIG. 8 is a schematic diagram in the case where a sheet resistance element is employed in the embodiment.

FIG. 8 is a schematic exemplary diagram in the case where a sheet resistance element is employed as the heater element in any of the foregoing embodiments. Referring to FIG. 8, a coil bobbin 10 surrounds a superconducting coil conductor 11 through an appropriate coil insulator 12. Besides, a sheet resistance element 13 as the heater element is buried in the coil insulator 12. By employing the sheet resistance element as the heater element in this manner, the superconducting coil 1 does not become distorted, and the heater element can be disposed in proximity to the superconducting coil conductor 11.

As described above, a superconducting magnet apparatus according to this invention comprises a superconducting coil, a persistent current switch and a protective element respectively connected in parallel with the superconducting coil and emergency run down unit including a heater circuit having a heater power source and a heater element disposed in proximity to the superconducting coil, and a heater element switch connected in series with the heater circuit. This construction achieves the effect that, when urgent demagnetization becomes necessary, the superconducting coil can be rapidly subjected to transition into a normal state by energizing and warming the heater element even if the protective element is of low resistance, and the effect that a switch of small current bearing capacity can be used as the persistent current switch, so the overall cost of the apparatus can be sharply lowered.

What is claimed is:

1. A superconducting magnet apparatus comprising a superconducting coil, a persistent current switch, and a protective element respectively connected in parallel with said superconducting coil and an emergency run down unit including a heater circuit having a heater power source, a heater element disposed in proximity to said superconducting coil, and a heater circuit switch means connected in series with said heater element and actuable to provide current to said heater element to warm said superconducting coil and initiate a quench to cause said superconducting coil to revert to a normal state.

2. A superconducting magnet apparatus as defined in claim 1 wherein said superconducting coil includes a plurality of coil segments in proximity to which corresponding heater elements are respectively disposed.

3. A superconducting magnet as defined in claim 2 wherein each of said heater elements has a heater circuit switch means enabling the heater elements to be initially energized at different times.

4. A superconducting magnet apparatus as defined in claim 1, wherein said heater element is a sheet resistance element.

5. A superconducting magnet apparatus as defined in claim 2 wherein said heater element is a sheet resistance element.

* * * * *